US012502804B2

(12) United States Patent
Sangiovanni et al.

(10) Patent No.: US 12,502,804 B2
(45) Date of Patent: Dec. 23, 2025

(54) MACHINE FOR DEPOSITING CERAMIC POWDERS

(71) Applicant: SYSTEM CERAMICS S.P.A., Fiorano Modenese (IT)

(72) Inventors: Carmine Sangiovanni, Formigine (IT); Eustachio Tarasco, Bologna (IT); Franco Gozzi, Formigine (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 37 days.

(21) Appl. No.: 18/014,091

(22) PCT Filed: Jul. 15, 2021

(86) PCT No.: PCT/IB2021/056389
§ 371 (c)(1),
(2) Date: Dec. 30, 2022

(87) PCT Pub. No.: WO2022/023856
PCT Pub. Date: Feb. 3, 2022

(65) Prior Publication Data

US 2023/0173710 A1 Jun. 8, 2023

(30) Foreign Application Priority Data

Jul. 30, 2020 (IT) ........................ 102020000018652

(51) Int. Cl.
*B28B 13/02* (2006.01)
*B28B 5/02* (2006.01)

(52) U.S. Cl.
CPC .............. *B28B 13/022* (2013.01); *B28B 5/02* (2013.01); *B28B 13/023* (2013.01)

(58) Field of Classification Search
CPC .... B28B 13/022; B28B 13/023; B28B 13/027
See application file for complete search history.

(56) References Cited

U.S. PATENT DOCUMENTS 2,541,899 A 2/1951 Wellman
4,786,342 A 11/1988 Zellner et al.
(Continued)

FOREIGN PATENT DOCUMENTS

CN 1803429 A * 7/2006
DE 102008009732 9/2008
(Continued)

*Primary Examiner* — Jerzi H Moreno Hernandez
(74) *Attorney, Agent, or Firm* — Chrisman Gallo Tochtrop LLC

(57) ABSTRACT

A machine (1) for depositing ceramic powders comprises a supply device (2) and a distributor device (3) of the ceramic powders. The supply device (2) is configured to convey the ceramic powders receiving them from a process situated upstream of the machine. The distributor (3) is movable along a processing direction (X) which extends in a support plane and is configured to receive the ceramic powders from the supply device (2) depositing at least one layer thereof on the support plane during an advancement and/or reverse movement thereof along the processing direction (X). A system for making ceramic tiles or slabs is also claimed, comprising (i) the machine (1) for depositing ceramic powders. (ii) a conveyor belt (11) defining the support plane and (iii) a pressing device arranged along the support plane downstream of the machine (1) and configured to press at least one layer of ceramic powders deposited by the machine (1).

9 Claims, 2 Drawing Sheets

(56) References Cited

U.S. PATENT DOCUMENTS

| | | | |
|---|---|---|---|
| 5,862,612 A | 1/1999 | Bielfeldt | |
| 2012/0168527 A1 | 7/2012 | Li et al. | |
| 2019/0217501 A1 | 7/2019 | Ricci et al. | |
| 2021/0379794 A1 * | 12/2021 | Vaccari | B28B 3/02 |

FOREIGN PATENT DOCUMENTS

| | | | |
|---|---|---|---|
| EP | 1201383 | A2 | 5/2002 |
| EP | 0793565 | B1 | 3/2003 |
| EP | 3616865 | A1 | 3/2020 |
| ES | 2154513 | A1 | 4/2001 |
| IT | 201800010925 | | 6/2020 |
| WO | 9615888 | A1 | 5/1996 |
| WO | 2014/066211 | A1 | 5/2014 |

* cited by examiner

MACHINE FOR DEPOSITING CERAMIC POWDERS

The present invention relates to the technical sector of processing ceramic materials.

In particular, the present invention relates to a machine for depositing ceramic powders which can be used in a system for making ceramic articles such as tiles and slabs, as well as the related system.

As is known, ceramic tiles or slabs can be made by depositing on a conveyor belt one or more layers of ceramic powder (according to the desired thickness of the finished product) which are subsequently pressed.

In known machines, the ceramic powders are applied on a conveyor belt while it moves below an appropriate distribution device.

Once the entire layer has been deposited, the conveyor belt conveys it along the processing direction until it is brought into a pressing device.

At this point the conveyor belt stops until the end of the ceramic powder pressing process.

It is clear that this operating mechanism leads to reduced productivity due to the onset of numerous downtimes in which the distributor is inactive, as during pressing the conveyor belt necessarily remains stationary also with respect to the distributor, not enabling it to deposit a further layer of ceramic powders.

In this context, the technical task underpinning the present invention is to provide a machine for depositing ceramic powders which obviates at least some of the drawbacks in the prior art as described above.

In particular, it is an object of the present invention to provide a machine for depositing ceramic powders able to operate continuously, eliminating expensive and inefficient machine downtimes, in particular during the performance of the ceramic powder pressing process.

The set technical task and aims are substantially attained by a machine for depositing ceramic powders, comprising the technical characteristics set out in one or more of the appended claims.

According to the present invention, a machine is shown for depositing ceramic powders, which comprises a supply device and a distributor device of the ceramic powders.

The supply device is configured to convey the ceramic powders receiving them from a process situated upstream of the machine.

The distributor is movable along a processing direction which extends in a support plane and is configured to receive the ceramic powders from the supply device depositing at least one layer thereof on the support plane during an advancement and/or reverse movement thereof along the processing direction.

Advantageously, the machine described herein increases the production capacity of a system for processing ceramic powders as it can operate continuously the deposition of subsequent layers of powder regardless of the behaviour (in particular the state of movement) of the work plane on which the deposition is performed.

The subject matter of the present invention is also a system for making ceramic tiles or slabs that comprises a machine for depositing ceramic powders according to the present invention.

The system further comprises a conveyor belt defining the support plane and a pressing device arranged along the support plane downstream of the machine and configured to press the at least one layer of ceramic powders deposited by the machine.

The dependent claims, incorporated herein by reference, correspond to different embodiments of the invention.

Further characteristics and advantages of the present invention will become more apparent from the general and thus non-limiting description of a preferred, but not exclusive, embodiment of a machine for depositing ceramic powders, as illustrated in the accompanying drawings, in which.

Figure 1A:
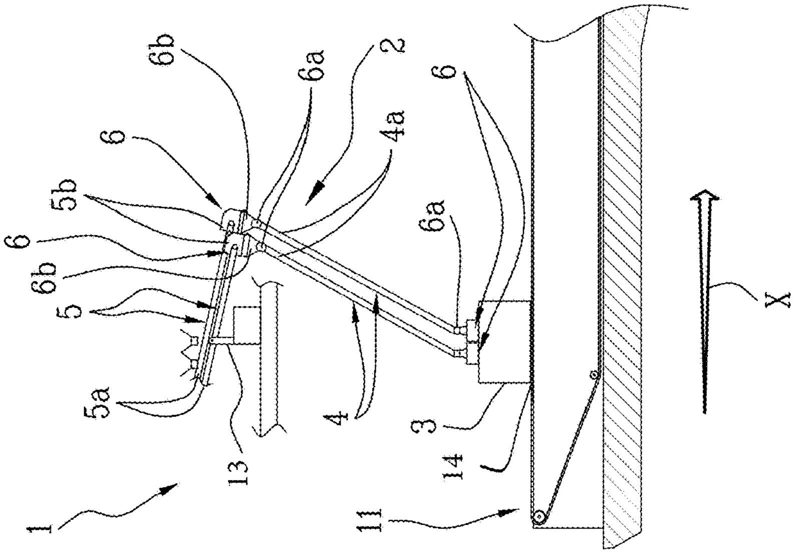
FIGS. 1A-1C show subsequent steps of the use of a machine for depositing powders according to the present invention.

In the appended figures, reference number 1 generally indicates a machine for depositing ceramic powders, to which reference will be made in the following present description simply as machine 1.

The machine 1 according to the present invention lends itself particularly well to the controlled dispensing of a loose material, in granular or powdered form. Therefore, an example of material that can be advantageously deposited through the machine according to the present invention comprises ceramic powders such as granulates or spray dried powders.

Structurally, the machine 1 comprises a supply device 2 and a distributor 3.

In use, the supply device 2 conveys the ceramic powders to the distributor 3 receiving them from a process arranged upstream of the machine 1, for example from a tank inside which such ceramic powders are stored or from other devices adapted for the production thereof.

In particular, the distributor 3 is arranged below the supply device 2 so that the ceramic powders are supplied to the distributor at least partially by dropping due to the effect of the force of gravity.

The distributor 3 is therefore configured to deposit the ceramic powders received from the supply device 2 on a support plane in one or more overlapping layers (as a function for example of the desired thickness for the finished product to be obtained).

In particular, the distributor 3 is movable along a processing direction "X" which lies on the support plane so as to enable it to perform the deposition of the ceramic powders during subsequent advancement and reverse movements along such processing direction "X".

In other words, the distributor 3 slides by advancing and reversing along the processing direction "X" and during its own movement it releases the ceramic powders that it has received from the supply device depositing them in subsequent layers on the support plane.

The motion of the distributor 3 therefore implies the deposit of the ceramic powders in one or more continuous layers and by regulating the sliding speed thereof, it is possible to modulate the thickness or height of the layer that is deposited.

In particular, as will be explored in more detail below, the distributor 3 can be used to deposit the ceramic powders on a movable conveyor plane, in predetermined positions and amounts.

The movable plane can be activated in movement along the processing direction to convey the layers of ceramic powders deposited by the distributor 3 towards subsequent processes to be performed downstream of the machine 1.

Structurally, the distributor 3 can comprise a predefined number of dispensing devices arranged along an alignment direction transverse to the processing direction "X", flanked to each other, to create an applicator of ceramic powders of a predefined length.

In other words, in this way, a dispensing opening 14 is created in a flattened form which defines an extended dispensing front along the alignment direction of the dispensing devices that is transverse to the processing direction "X".

For example, in the case indicated above of deposit on an underlying movable plane, the dispensing front with the alignment direction of the dispensing devices transverse to the conveying direction of the movable plane substantially allows the product to be deposited over the entire width of the movable plane, understood as an extension measured transversally to the processing direction "X".

To supply the ceramic powders to the distributor 3 during the movement thereof along a processing direction "X", the supply device 2 comprises a tubular element 4 which has a first end 4*a* adapted to receive at the inlet the ceramic powders and a second end 4*b* coupled to the distributor 3 for supplying the ceramic powders thereto.

Furthermore, the supply device 2 can comprise a conveyor 5 which interfaces the tubular element 4 with a ceramic powder conveying system arranged upstream of the machine 1 (for example the already mentioned tank).

In detail, the conveyor 5 extends between an initial loading portion 5*a* adapted to receive the ceramic powders from a process upstream of the machine 1 and a terminal unloading portion 5*b* coupled to the first end 4*a* of the tubular element 4.

According to a preferred embodiment, illustrated in the appended figures, the conveyor 5 is made by a conveyor belt whose sliding speed can be modulated to regulate the amount of ceramic power transferred to the tubular element 4 and therefore to the distributor 3.

According to one aspect of the present invention, the tubular element 4 is a rigid tubular element and therefore also the first end 4*a* thereof moves with a motion induced by the sliding of the distributor along the processing direction "X".

According to such aspect the tubular element 4 defines a linear falling path for the ceramic powders which extends from the first end 4*a* to the second end 4*b* guaranteeing the correct conveying thereof and preventing the accumulation thereof within the tubular element 4 itself.

In this context, the conveyor 5 is movable so as to keep the terminal unloading portion 5*b* coupled to the first end 4*a* during the advancement and reverse motion of the distributor 3.

In other words, to perform the deposition of ceramic powders on the support plane, the distributor 3 is moved along the processing direction "X" also causing the movement of the tubular element 4 connected thereto, to maintain the correct coupling between the tubular element 4 and the conveyor 5 (so as never to interrupt the supply of ceramic powders to the distributor 3), the latter in turn movable so as to compensate and follow the movement of the first end 4*a* of the tubular element 4.

Structurally, the supply device 2 comprises a flexible connection element 6 interposed between the first end 4*a* and the terminal unloading portion 5*b* of the conveyor 5 which couples the two elements so that they are mutually hinged enabling mutual movement, in particular inclination, during the movement of the distributor 3.

In detail, the tubular element 4 is pivoted to the terminal unloading portion 5*b* of the conveyor 5.

Preferably, the flexible connection element 6 specifically comprises a universal joint 6*a* configured to hinge the first end 4*a* of the tubular element 4 to the terminal unloading portion 5*b*.

The flexible connection element 6 can further comprise a hopper 6*b* having an inlet mouth facing the terminal unloading portion 5*b* for receiving the ceramic powders from the latter and an unloading mouth placed in direct communication with the first end 4*a* and connected to the latter by means of the universal joint 6*a*.

According to the preferred embodiment, the conveyor 5 is further hinged at the initial loading portion 5*a* (for example to a fixed support such as a bar or a frame) so that the movement of the first end 4*a* of the tubular element 4 generates a subsequent raising and lowering of the terminal unloading portion 5*b*.

Figure 1B:
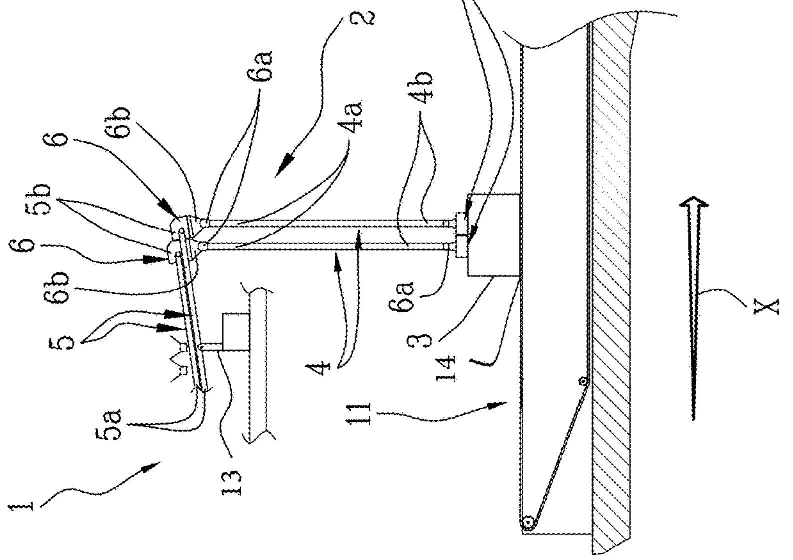
Figure 1C:
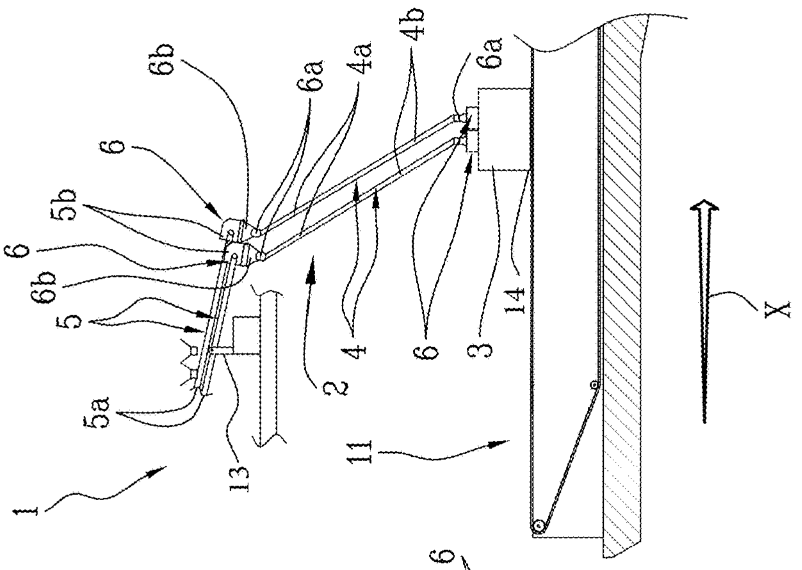
Figure 2:
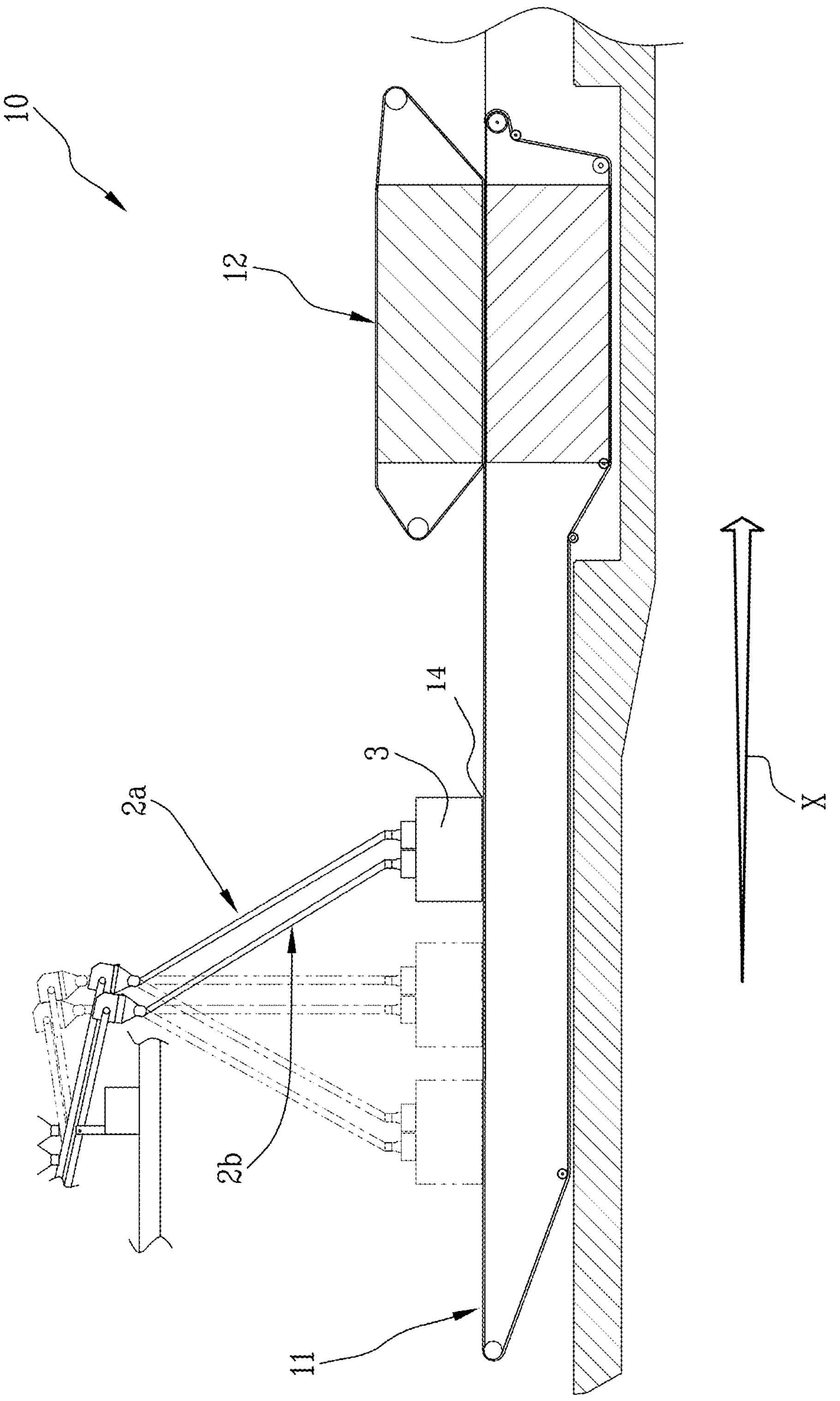
FIG. 2 shows a system for depositing powders according to the present invention.

In other words, as illustrated in particular in FIGS. 1A to 1C, the movement of the distributor 3 cyclically determines a corresponding increase/decrease in the inclination of the tubular element 4 with respect to the support plane and therefore a progressive and continuous raising and lowering of the first end 4*a*.

The terminal unloading portion 5*b*, which is connected to the first end 4*a* by means of the flexible connection element 6*a*, therefore follows the movement thereof by raising and lowering itself to follow the movements imposed on the tubular element 4 by the distributor 3.

In detail, the movement of the conveyor 5 is a rotational movement about a hinging axis of the initial loading portion 5*a* which is preferably arranged transversally to the processing direction "X".

The supply device 2 can further comprise a further flexible connection element 6 interposed between the second end 4*b* and the distributor 3.

In particular, in such context, the second end 4*b* of the tubular element 4 is movable transversally to the processing direction "X" so as to be able to sequentially supply the ceramic powders to the various portions that compose the dispensing opening 14.

Structurally, the second end 4*b* is coupled by means of the flexible connection element 6, preferably made by a universal joint 6*a*. The second end 4*b*, together with the flexible connection element 6 made by a universal joint 6*a*, is movable through a linear guide positioned above the distributor 3 and transversally to the processing direction "X". During its transverse movement of the second end 4*b* performed through motor means, the supply device 2 progressively supplies the distributor 3 for the entire width thereof.

The supply device 2 can further comprise at least one shock absorber 13 coupled to the conveyor 5 and active on an intermediate portion thereof (i.e. a portion interposed between the initial loading portion 5*a* and the terminal unloading portion 5*b*) to promote and cushion the raising and lowering movement of the conveyor 5.

The shock absorber 13 is especially used to discharge the weight of the entire supply device (2), comprising the conveyor (5), the flexible connection element (6) and the tubular element (4) and is a passive element which is not controlled and as though it were a counter-weight for lightening the overlying load and keeping it pendular.

In detail, the shock absorber 13 can comprise an air pre-loaded hydraulic shock absorber.

According to a preferred embodiment, the machine 1 comprises a pair of supply devices 2 both connected to the same distributor 3.

In particular, the machine 1 comprises a supply device 2*a* coupled at a first end of the distributor 3 along the processing direction "X" to a second supply device 2*b* coupled at a second end of the distributor 3 opposite the first end. Such supply devices 2 can be configured to supply ceramic powders at distinct dispensing openings, thus enabling two layers of the same ceramic powder to be deposited simultaneously, or each depositing particularly effectively a respective different type of ceramic powder.

Alternatively, both supply devices 2 can be operatively arranged to power the same dispensing opening, so as to guarantee at all times the correct supply of the dispensing opening.

Advantageously, the present invention achieves the proposed objects, overcoming the disadvantages complained of in the known art by providing the user with a machine 1 for depositing ceramic powders that can also operate when the work plane remains stationary for pressing previously deposited layers.

The subject matter of the present invention is also a system 10 for making ceramic tiles or slabs, in particular a system 10 that comprises a machine 1 made according to one or more of the technical characteristics outlined above.

The system 10 further comprises a conveyor belt 11 which extends along the processing direction "X" defining the support plane on which the distributor 3 can deposit the ceramic powders and a pressing device 12 arranged along the support plane downstream of the machine 1 and configured to press the at least one layer of ceramic powders deposited thereby.

In particular, during use, the layer of ceramic powder deposited by the machine 1 on the support plane is supplied by means of the conveyor belt 11 to the pressing device 12.

For example, the pressing device 12 can be made by means of a belt press, known in the sector for the pressing of large-format slabs.

A press of this type comprises a lower pad, provided with a pressing surface facing upwards, and an upper pad provided with a pressing surface facing downwards and located above the lower pad.

At least one of the two pads is movable nearingly and distancingly to and from the other in order to carry out a pressing of the layer of ceramic powder. The system 10 can also comprise further processing stations, not illustrated in the appended figures, arranged to perform the respective processing procedures necessary for making a finished product (a ceramic slab or tile).

Such processing stations can comprise, by way of non-limiting example, at least one cutting station, in which the slab made inside the pressing device 12 is split into two or more distinct elements with predefined dimensions, or further stations configured to make ceramic powders or to move and store semi-finished products and finished products such as ceramic slabs and tiles.

Advantageously, the present invention achieves the proposed objects, overcoming the disadvantages complained of in the known art by providing the user with a system for making ceramic tiles and slabs that can operate with high productivity eliminating the expensive downtimes of the depositing machine 1 during the pressing of the layers of ceramic powder inside the pressing device 12.

The invention claimed is:

1. A machine for depositing ceramic powders comprising:

a supply device configured to convey said ceramic powders, the supply device comprises a tubular element for transferring the ceramic powders;

a conveyor that extends between an initial loading portion, adapted to receive the ceramic powders from a process upstream of the machine, and a terminal unloading portion coupled to a first end of the tubular element for receiving the ceramic powders; and a distributor of the ceramic powders arranged below the supply device and movable along a processing direction (X) parallel to a conveyor belt, said distributor being configured to receive said ceramic powders from the tubular element of the supply device and to deposit at least one layer of said ceramic powders onto the conveyor belt during an advancement and/or reverse movement of the distributor along the processing direction (X), wherein the tubular element has a second end coupled to the distributor for transferring the ceramic powders to said distributor, wherein the advancement and/or reverse movement of the distributor along the processing direction (X) causes a movement of the first end of the tubular element, and wherein the conveyor is hinged at the initial loading portion so that the movement of the first end of the tubular element leads to a subsequent raising and lowering of the terminal unloading portion.

2. The machine according to claim 1, wherein the conveyor transfers the ceramic powders to the tubular element.

3. The machine according to claim 2, wherein the tubular element is a rigid tubular element and the conveyor is movable so as to keep the terminal unloading portion coupled to the first end during the advancement and reverse movement of the distributor.

4. The machine according to claim 3, wherein the supply device comprises a flexible connection element interposed between the first end of the tubular element and the terminal unloading portion of the conveyor, said flexible connection element comprising a universal joint configured to hinge the first end to the terminal unloading portion.

5. The machine according to claim 1, wherein the supply device comprises at least one shock absorber coupled to the conveyor active on an intermediate portion of the conveyor to promote and cushion the raising and lowering movement of said conveyor.

6. The machine according to claim 1, wherein the distributor comprises a linear dispensing opening.

7. The machine according to claim 1, wherein the second end of the tubular element is movable.

8. The machine according to claim 1, comprising the supply device and a second supply device both coupled to the distributor.

9. A system for making ceramic tiles or slabs, comprising:

a machine for depositing ceramic powders according to claim 1; and a pressing device arranged along the conveyor belt downstream of the machine and configured to press the at least one layer of the ceramic powders deposited by the distributor of said machine.

* * * * *